US012649407B2

(12) United States Patent (10) Patent No.: US 12,649,407 B2
Makovsky (45) Date of Patent: Jun. 9, 2026

(54) PAYLOAD-INDEPENDENT MOUNTING DEVICE

(71) Applicant: Dalton J. Makovsky, Henrico, VA (US)

(72) Inventor: Dalton J. Makovsky, Henrico, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 490 days.

(21) Appl. No.: 18/197,208

(22) Filed: May 15, 2023

(65) Prior Publication Data

US 2024/0383395 A1 Nov. 21, 2024

(51) Int. Cl.
*B60P 7/08* (2006.01)
*B60P 7/06* (2006.01)

(52) U.S. Cl.
CPC .............. *B60P 7/0815* (2013.01); *B60P 7/06* (2013.01)

(58) Field of Classification Search
CPC ......... B60P 7/0815; B60P 7/0807; B60P 7/08; B60P 7/06; B60P 7/10; B60P 7/13; B64D 11/0696; B64D 9/003; B64D 9/00; B64D 2009/006; F16B 37/045; F16B 7/187; F16B 2/12; F16B 2200/30
USPC ........................................................ 410/104
See application file for complete search history.

(56) References Cited

U.S. PATENT DOCUMENTS

| | | | |
|---|---|---|---|
| 8,011,692 B2 * | 9/2011 | Friesen ................... | B60R 11/06 |
| | | | 280/759 |
| 8,100,600 B2 * | 1/2012 | Blum .................... | F16B 37/045 |
| | | | 403/256 |
| 8,366,340 B2 * | 2/2013 | Munakata ............. | F16B 37/045 |
| | | | 403/231 |

(Continued)

OTHER PUBLICATIONS

45° Angled Mounting Plate; product website; thorlabs.com/thorproduct.cfm?partnumber=AP45; Thorlabs; accessed Oct. 23, 2025; published Aug. 21, 2013. (Year: 2013).*

*Primary Examiner* — Amy R Weisberg
*Assistant Examiner* — Philip C Adams
(74) *Attorney, Agent, or Firm* — Gerhard W. Thielman

(57) ABSTRACT

An attachment fastener is provided for removably connecting a container onto a platform. The container includes a diagonal mount. The fastener includes a track, first and second lugs, and a tri-lobe block. The track is disposed on the platform and has a longitudinal direction. Each lug has distal and proximal faces along a longitudinal flange. The proximal face includes a tapering tongue that extends outward and along the flange. Each lobe on the block has a tapering groove for receiving and wedging the tongue. The distal face of the first and second lugs respectively engage the track and the mount. The first and second lobes of the block engage the respective tongues on the corresponding first and second lugs. An alternative fastener is provided for removably connecting first and second containers together, with each container having a corresponding diagonal mount. The fastener includes first and second lugs, and a quad-lobe (Continued)

block, each lobe having a tapering groove. The distal faces of the first and second lugs engage the corresponding mounts on the respective first and second containers. The first and second lobes of the block engage the respective tongues on the corresponding first and second lugs.

9 Claims, 10 Drawing Sheets

(56) References Cited

U.S. PATENT DOCUMENTS

| | | | | |
|---|---|---|---|---|
| 8,585,334 | B2 * | 11/2013 | Moradians | B64D 9/003 |
| | | | | 410/94 |
| 8,985,669 | B2 * | 3/2015 | Schmeichel | B23P 6/00 |
| | | | | 296/98 |
| 9,739,055 | B2 * | 8/2017 | DeZaio | F16B 7/0433 |
| 9,790,980 | B2 * | 10/2017 | McCarthy | F16B 37/045 |
| 10,641,302 | B1 * | 5/2020 | Huffman | F16M 13/022 |
| 11,236,774 | B1 * | 2/2022 | Bollman | A47B 13/02 |
| 11,680,418 | B2 * | 6/2023 | O'Connor | E04G 7/20 |
| | | | | 52/123.1 |
| 12,343,798 | B2 * | 7/2025 | Embler | B22F 10/38 |

* cited by examiner

PAYLOAD-INDEPENDENT MOUNTING DEVICE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to mechanical connectors. In particular, the invention relates to rigid fasteners for securing payload canisters prepared for transport, and that for rapid assembly and disassembly.

Pallet transport of elongated containers such as missile canisters aboard ship or aircraft presents various challenges. Conventional techniques engender deficiencies in rigidity and/or in rapid assembly and disassembly, as well as selective item removal without disruption of the remainder of the transported package.

SUMMARY

Conventional fasteners yield disadvantages addressed by various exemplary embodiments of the present invention. In particular, various exemplary embodiments provide an attachment fastener for removably connecting a container onto a platform. The container includes a diagonal mount. The fastener includes a track, first and second lugs, and a tri-lobe block. The track is disposed on the platform and has a longitudinal direction. Each lug has distal and proximal faces along a longitudinal flange. The proximal face includes a tapering tongue that extends outward and along the flange.

Each lobe on the block has a tapering groove for receiving and wedging the tongue. The distal face of the first and second lugs respectively engage the track and the mount. The first and second lobes of the block engage the respective tongues on the corresponding first and second lugs.

Alternative embodiments provide an attachment fastener for removably connecting first and second containers together, with each container having a corresponding diagonal mount. The fastener includes first and second lugs, and a quad-lobe block, each lobe having a tapering groove. The distal faces of the first and second lugs engage the corresponding mounts on the respective first and second containers. The first and second lobes of the block engage the respective tongues on the corresponding first and second lugs.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in meters (m), mass in grams (g), time in seconds(s), angles in degrees (°) and force in newtons (N). Supplemental measures can be derived from these, such as density in grams-per-cubic-centimeters $(g/cm^3)$, moment of inertia in gram-square-centimeters $(g\text{-}cm^2)$ and the like.

Conventionally available methods for restraining payload stacks include straps, cargo nets, and hard points. Straps and cargo nets provide limited payload stiffness. The exemplary concept constitutes a more rigid solution than these and would better survive environmental loadings as well as long-term restraint scenarios.

The purpose of the exemplary Payload Independent Mounting Interface is to enable munition launchers and various other payloads to be interfaced to one another in a stackable format and as a mounting interface for the payload stack to mount to a set of logistics track on a mobile platform. Available standard hardware for logistics track (L-track) does exist. However, there is nothing that can tether multiple launchers together at a singular mounting point in a strong, sturdy manner capable of withstanding environmental and launch loads.

Conventional L-track mounting interfaces are generally used as single-point mounts for a strap eyelet, or stud. Being that multiple launchers are expected to be mounted together, base mounting interfaces for a stack of canisters should be able to withstand large launch forces while at the same time be easily installed and removed.

Such mounting interfaces also needed to be readily accessible from one end of the canister stack for single launcher removal. Research revealed no commercial off-the-shelf (COTS) item capable of satisfying this requirement. The goal of this mounting interface is to be able to mount launchers and possibly other payloads of varying sizes to one another to essentially produce a single rigid payload stack that would be mounted via L-track to a base platform.

Figure 1A:
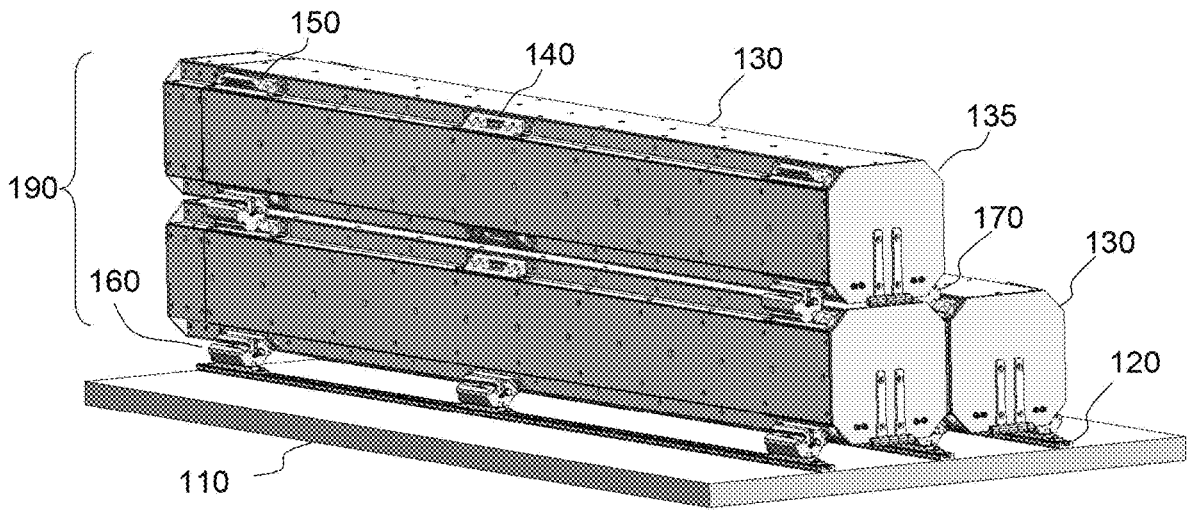
FIGS. 1A and 1B are isometric assembly views of a payload package for transport.
Figure 1B:
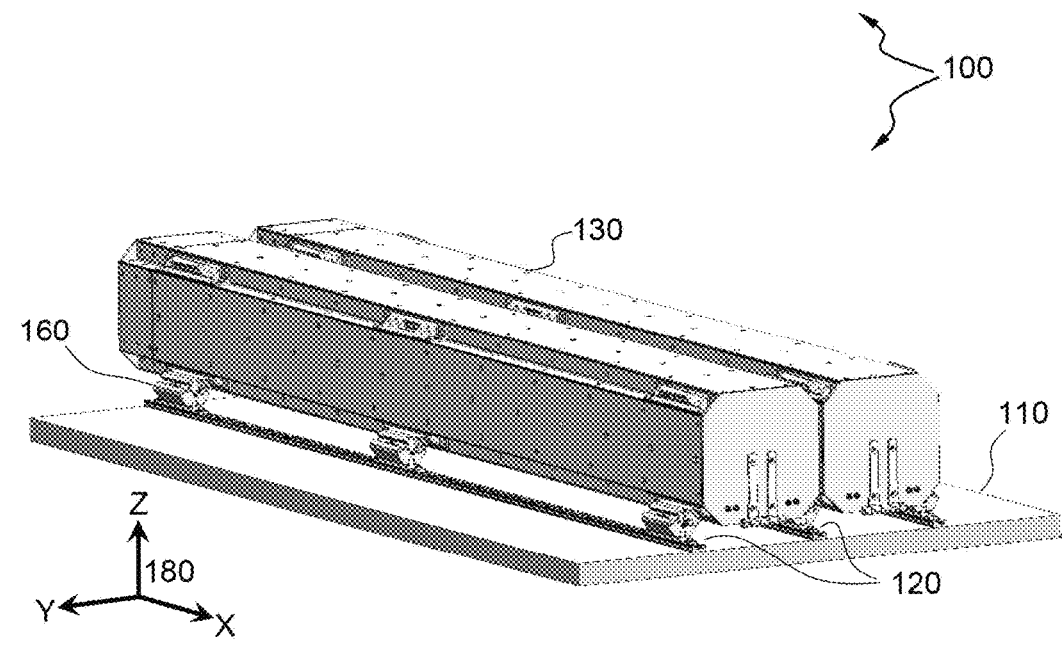

FIGS. 1A and 1B show isometric assembly views 100 of exemplary canister stack arrangements. A pallet 110 serves as a transport platform, such as aboard a cargo carrier. A plurality of parallel L-tracks 120 extends along the pallet 110. A plurality of launching canisters 130 (i.e., launchers or other similar containers) for containing an elongated payload is disposed between the tracks 120. Each canister 130 has a hatch door 135 at one end and holder mounts 140 along its edges for receiving attachments.

A plurality of fastening lugs 150 connect to select mounts 140. Each track 120 can receive a three-lobe block 160. Each lug 150 can receive a four-lobe block 170. As a matter of perspective, the blocks 160 and 170 are 12.1 cm in length to accompany a 2.6 m canister 130. Composed of 6061-T6 aluminum alloy, the blocks 160 and 170 each have a mass of about 0.84 kg. The lugs 150 are similarly composed of aluminum. The blocks 160 and 170 serve as brackets for rapid and convenient rigid connection of canisters 130 for transport, while enabling rapid and convenient disconnection for removal upon reaching transfer destination.

A Cartesian compass rose 180 provides orientation for further description, with X as longitudinal direction parallel to the tracks 120, Y as lateral direction perpendicular to the tracks 120 along the horizontal surface of the pallet 110, and Z as vertical perpendicular to the surface of the pallet 110. Such exemplary connectors enable a stack 190 of canisters 130 to be rigidly secured to the pallet 110.

Figures 2A, 2B, 2C:
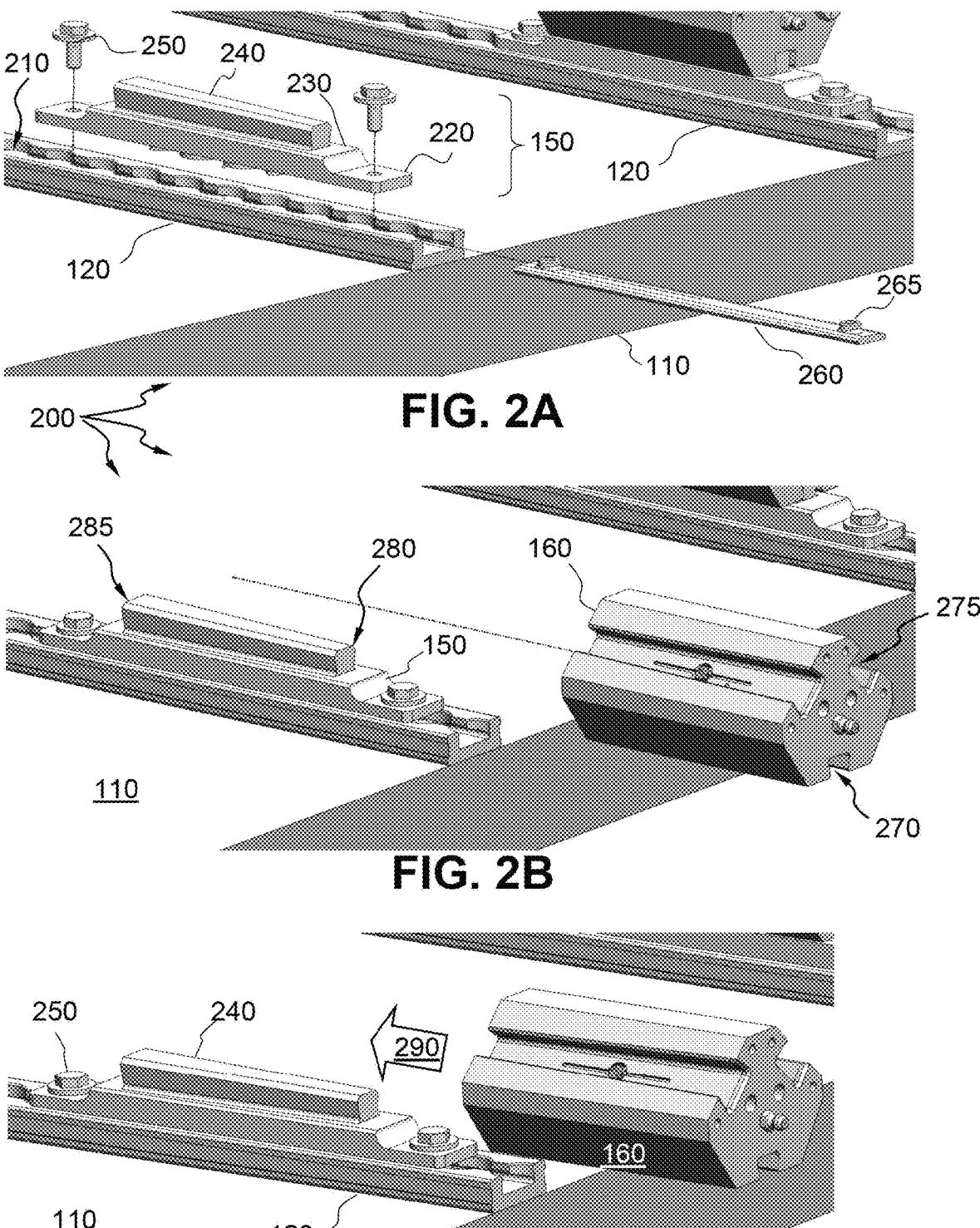
FIGS. 2A, 2B and 2C are isometric exploded views of a connector to a floor.

FIGS. 2A, 2B and 2C show isometric exploded and partial assembly views 200 of a flange lug 150 along a track 120 accompanied by a three-lobe block 160. The track 120 includes a corrugated channel 210 opposite the pallet 210, and a uniform slot underneath the channel 210, both of which extend the entire length of the track 120. The lug 150 comprises a base flange 220 with a raised land 230, and a tapered tongue 240 disposed on the land 230.

A pair of bolts 250 secures the lug 150 to the track 120. A slide strip 260 with through holes 265 at the extremities passes underneath the lug 150. Channels into the block 160 include a narrow opening 270 and a wide opening 275. The tongue 240 correspondingly includes a narrow fore end 280 and a wide aft end 285. The block 160 directionally slides 290 aft along the tongue 240, enabling its narrow end 280 to insert into the wide opening 275 of the groove 360 and wedging the block 160 to the lug 150.

Figure 3:
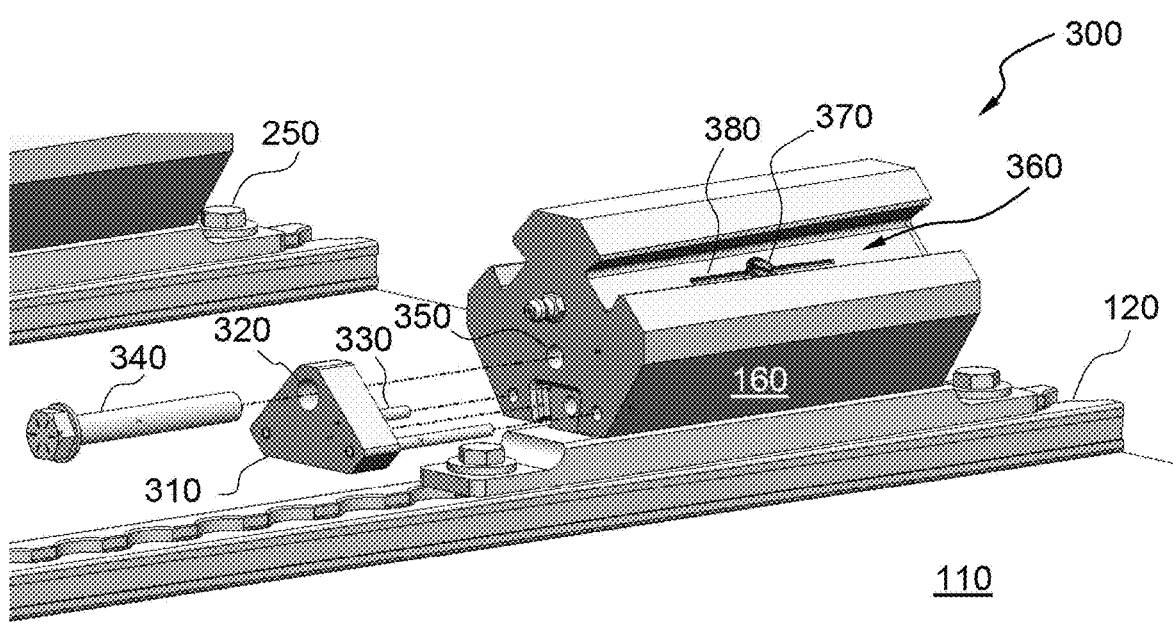
FIG. 3A is an isometric assembly view of a three-lobe connector.

FIG. 3 shows an isometric exploded view 300 of a clamp 310 to hold the block 160 on the lug 150 and inhibit inadvertent detachment. The clamp 310 forms a somewhat triangular plate through which a hole 320 passes and a pair of prongs 330. A bolt 340 passes through the hole 320 and into a threaded longitudinal cavity 350 of the block 160 to screw the bolt 340 into position. Three tapered grooves 360 extend longitudinally along the block 160 to receive the tongue 240 at the wide end 275 with linear shift in the groove's width.

The block 160 orients such that the groove 360 on the bottom broad side has the narrow opening 270 at the front, and the broad opening 275 at the rear, whereas the grooves 360 facing diagonally employ the reverse taper direction. An insertion plug 370 within a slot 380 caps grease passages to an unused groove 360. The grease within the block 160 serves to lubricate the groove 360 that engages a corresponding tongue 240.

Figure 4A:
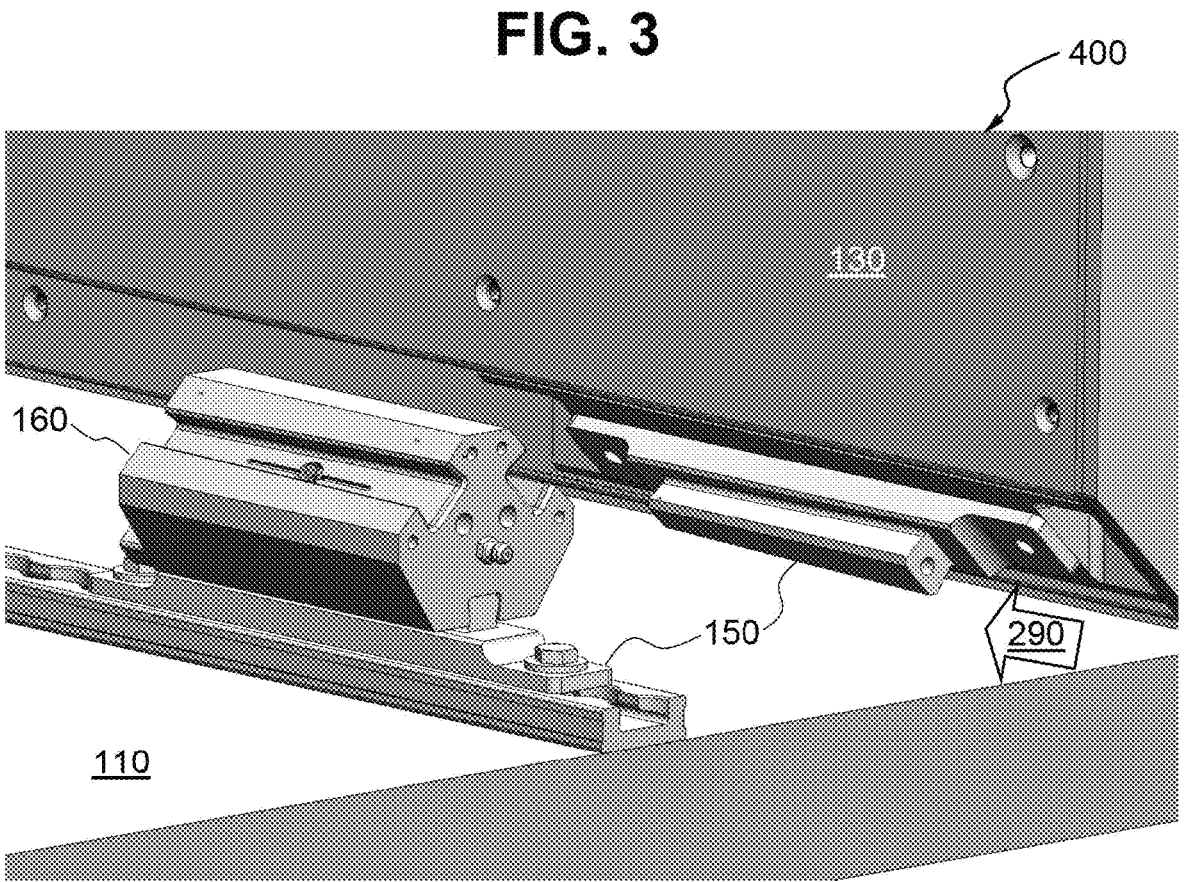
FIGS. 4A, 4B 4C are isometric assembly views of the connector.
Figures 4B, 4C:
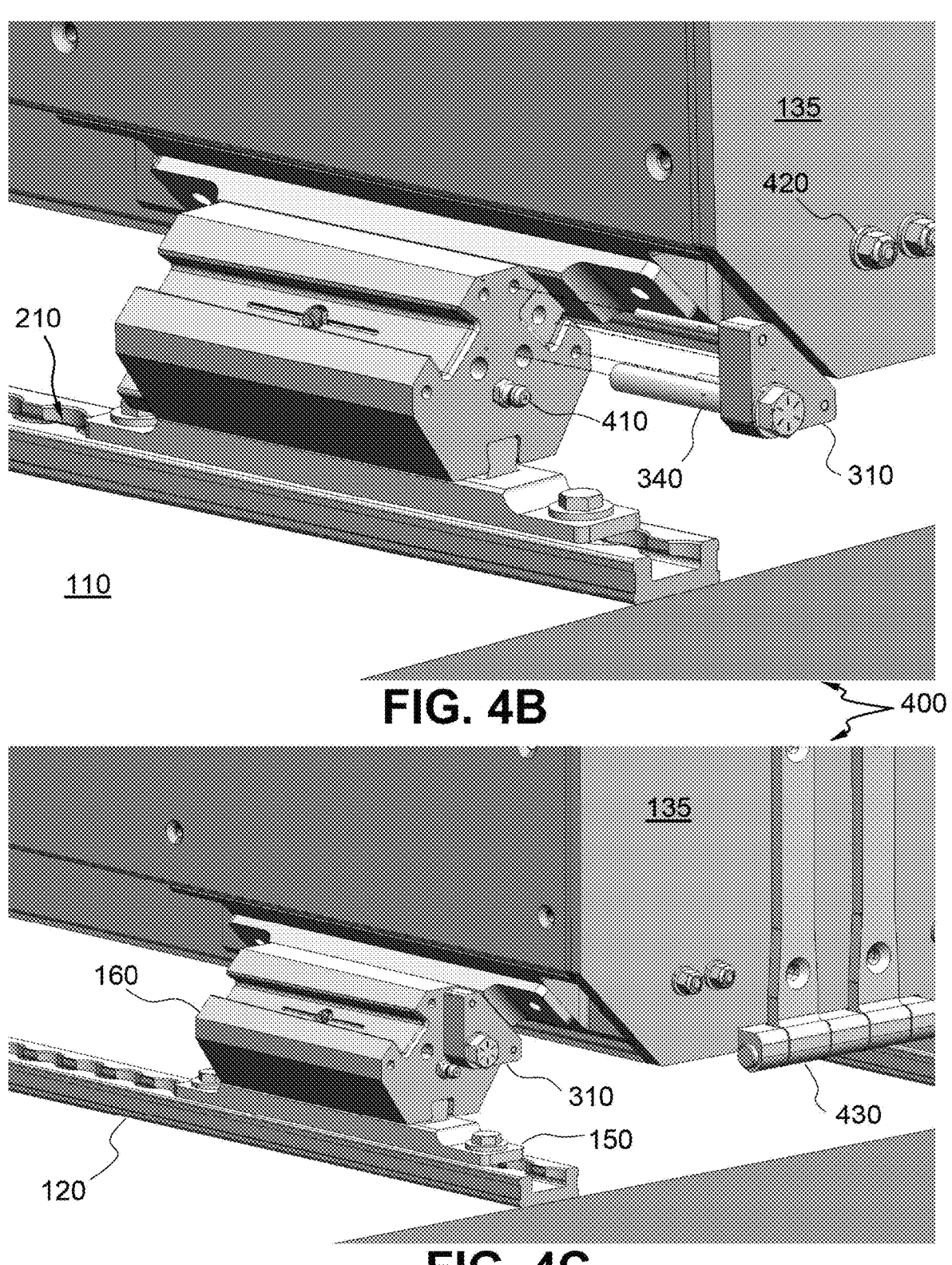

FIGS. 4A, 4B and 4C show isometric assembly views 400 of the exemplary tri-lobe connector that attaches to the track 120. With the block 160 secured to the lug 150 on the track 120, another lug 150 attached to the mount 140 on the canister 130 can slide to engage its tongue 240 into a diagonally oriented groove 360 of the block 160. The block 160 includes a grease zerk 410 at both front and rear for inserting grease as lubricant into the block 160. The canister 130 includes bolts 420 for securing its end door 135, as well as hinges 430 for opening that door 135.

FIG. 4A shows the canister 130 prior to sliding into position for transport, while FIG. 4B shows the lug 150 on the canister 130 attached to the block 160. FIG. 4C shows the clamp 310 securing the lug 150 from longitudinal motion away from the block 160. The clamp 310 blocks the aft end 285 of the tongue 240 from sliding out from the groove 360 of the block 160 after the bolt 340 inserts into the cavity 350.

Figures 5A, 5B:
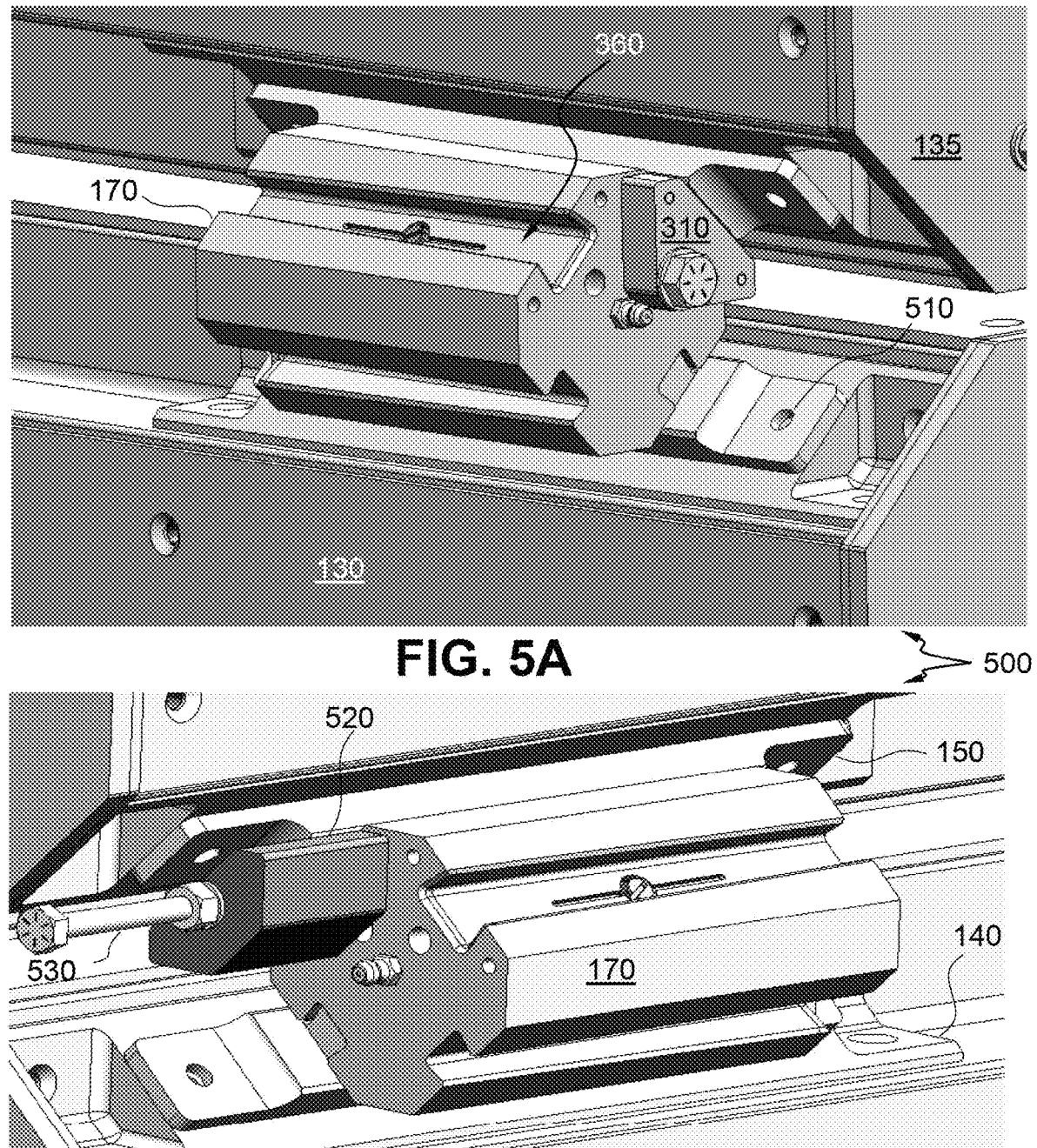
FIGS. 5A and 5B are isometric views of a four-lobe connector.

FIGS. 5A and 5B show assembly views 500 of an alternative exemplary connector that attaches to the canister 130. The four-lobe block 170 has two (lower) grooves 360 with the narrow opening 270 at the front, and two (upper) grooves 360 with the broad opening 275 at the front. The base flange 220 of the lug 150 includes a pair of through holes 510 to receive the screws 250. The block 170 also includes the zerk 410 for inserting grease.

As shown, the block 170 attaches to both upper and lower lugs 150 with their tongues 240 engaging in corresponding grooves 360 and secured by respective clamps 310. In this example, the block 170 slid forward (towards the right) into the lug 150 of the lower canister 130 and secured. Then, the upper canister 130 slid backward (i.e., aft, towards the left) for that lug 150 to engage the block 170. A removal tool 520 uses a long bolt 530 to pull a tongue 240 from the groove 360 in the event of high resistance.

Figures 6A, 6B, 7:
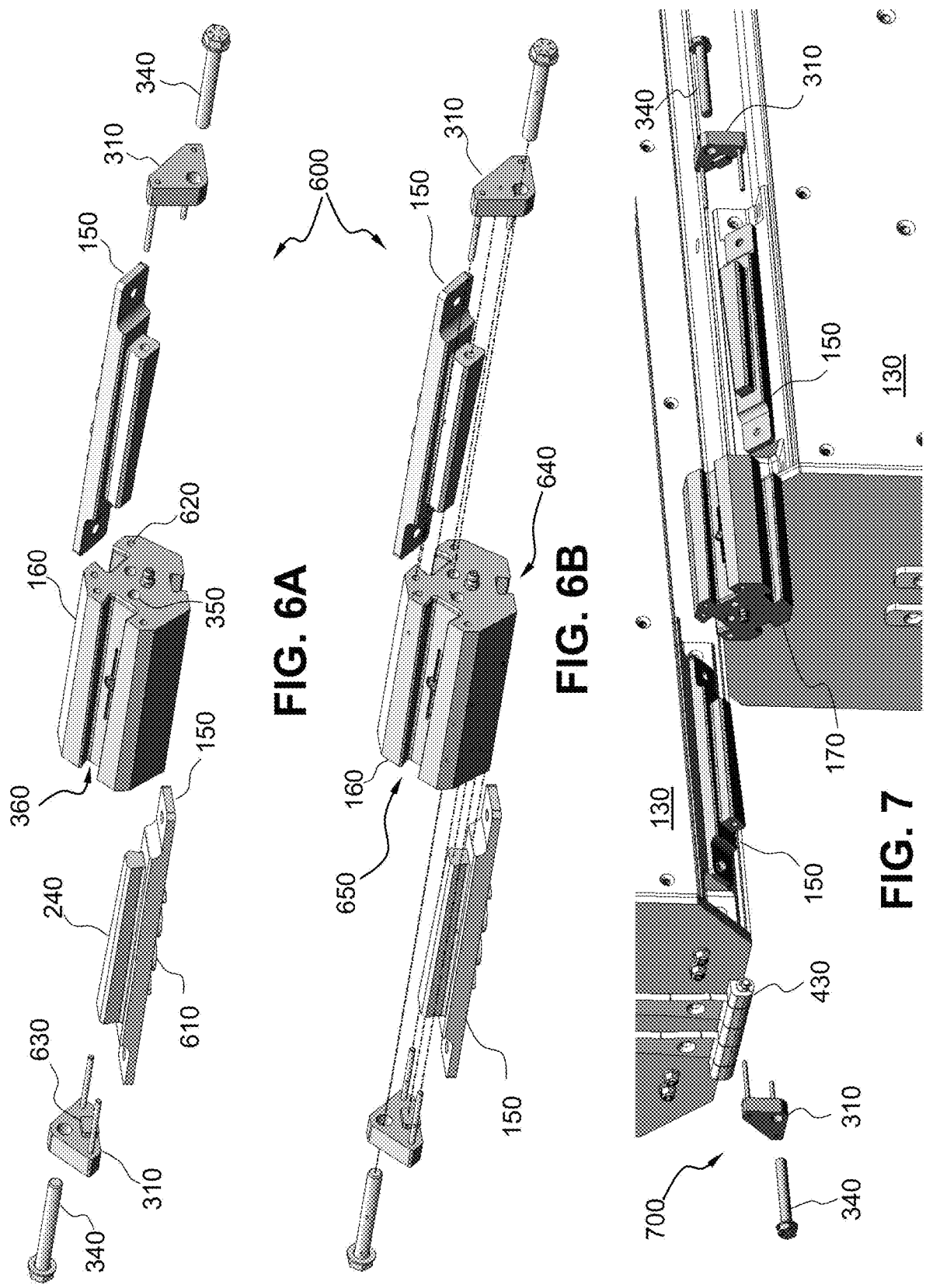
FIGS. 6A and 6B are isometric exploded views of the three-lobe connector.
FIG. 7 is an isometric exploded view of the four-lobe connector.

FIGS. 6A and 6B show isometric exploded views 600 of the exemplary three-lobe connector. From left to right, the components include the aft bolt 340, the aft clamp 310, the track lug 150, the block 160, the flange lug 150, the fore clamp 310 and the fore bolt 340. The clamps 310 and bolts 340 fore and aft are identical. The lugs 150 that attach to the track 120 and the mount 140 are identical.

Under the base flange 220, the lug 150 includes cylindrical protrusions 610 that wedge within the channel 210 of the track 120. These protrusions 610 extend inward from a distal side of the lug 150, whereas the tongue 240 extends outward from a proximal side of the lug 150. The block 160 includes a pair of holes 620 that flank each wide end 275 for receiving prongs 330 that extend from the clamp 310, which also includes a plug 630 to restrict translation of the tongue 240 upon assembly. Dash lines illustrate alignment of select components into specific cavities for assembly.

The three-lobe block 160 features a bottom lobe 640 for orientation parallel to the pallet 110 and the track 120, as well as diagonal lobes 650 to engage edges of an adjacent canister 130. The wide openings 275 of the grooves 360 permit engagement with corresponding tongues 240 at opposite ends of the distinct bottom and diagonal lobs 640 and 650.

FIG. 7 shows an isometric exploded view 700 of the exemplary four-lobe connector. Upper and lower canisters 130 are separated longitudinally and vertically. A lower lug 150 with its narrow end 280 facing forward is disposed on a lower mount 140 of the lower canister 130. An upper lug 150 with its narrow end 280 facing aft is disposed on an upper mount 140 of the upper canister 130.

A four-lobe block 170 is disposed therebetween with its grooves 360 arranged to slide onto the tongues 240 of the lower and upper lugs 150 such that the block's wide opening 275 on its diagonal lobe 650 receives the tongue's narrow end 280. Corresponding clamps 310 fastened by accompanying bolts 340 can affix the block 170 to the upper and lower lugs 150 upon assembly.

Figures 8A, 8B, 8C:
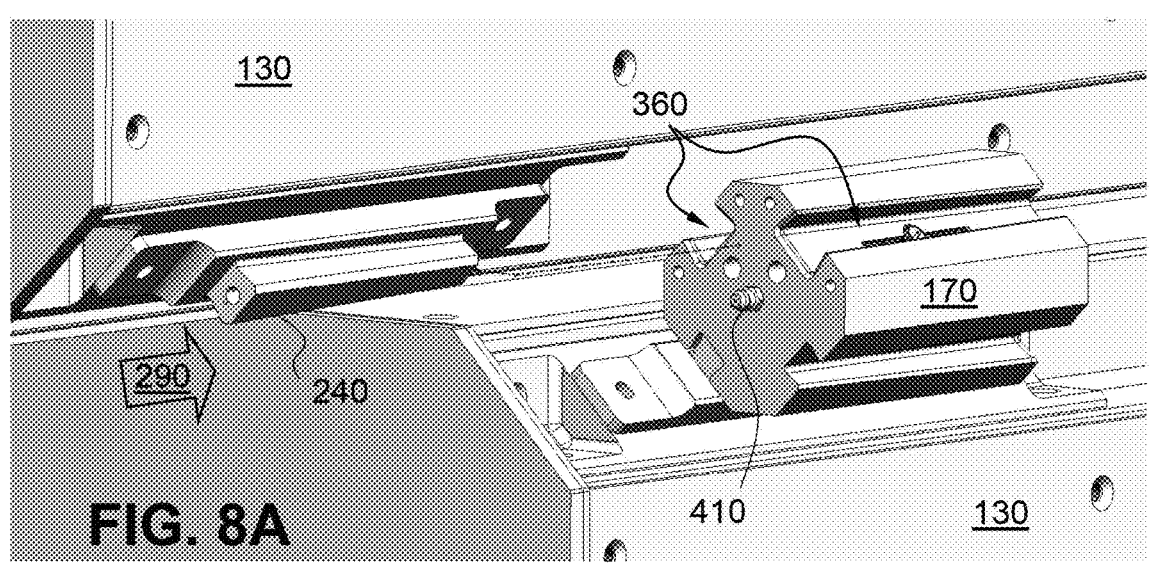
FIGS. 8A, 8B, 8C and 8D are isometric assembly views of the four-lobe connector.

FIGS. 8A, 8B, 8C and 8D show isometric partial and full assembly views 800 of the exemplary four-lobe connector. As shown in FIG. 8A, the block 170 attaches to the lower lug 150 secured to the lower canister 130. The upper canister 130 is disposed above and to the rear of the lower canister 130 to slide 290 forward. Upon completion in FIG. 8B, the tongue 240 of the upper lug 150 engages its associated groove 360 on the block 170 from the broad end 275.

Figures 8D, 9A, 9B:
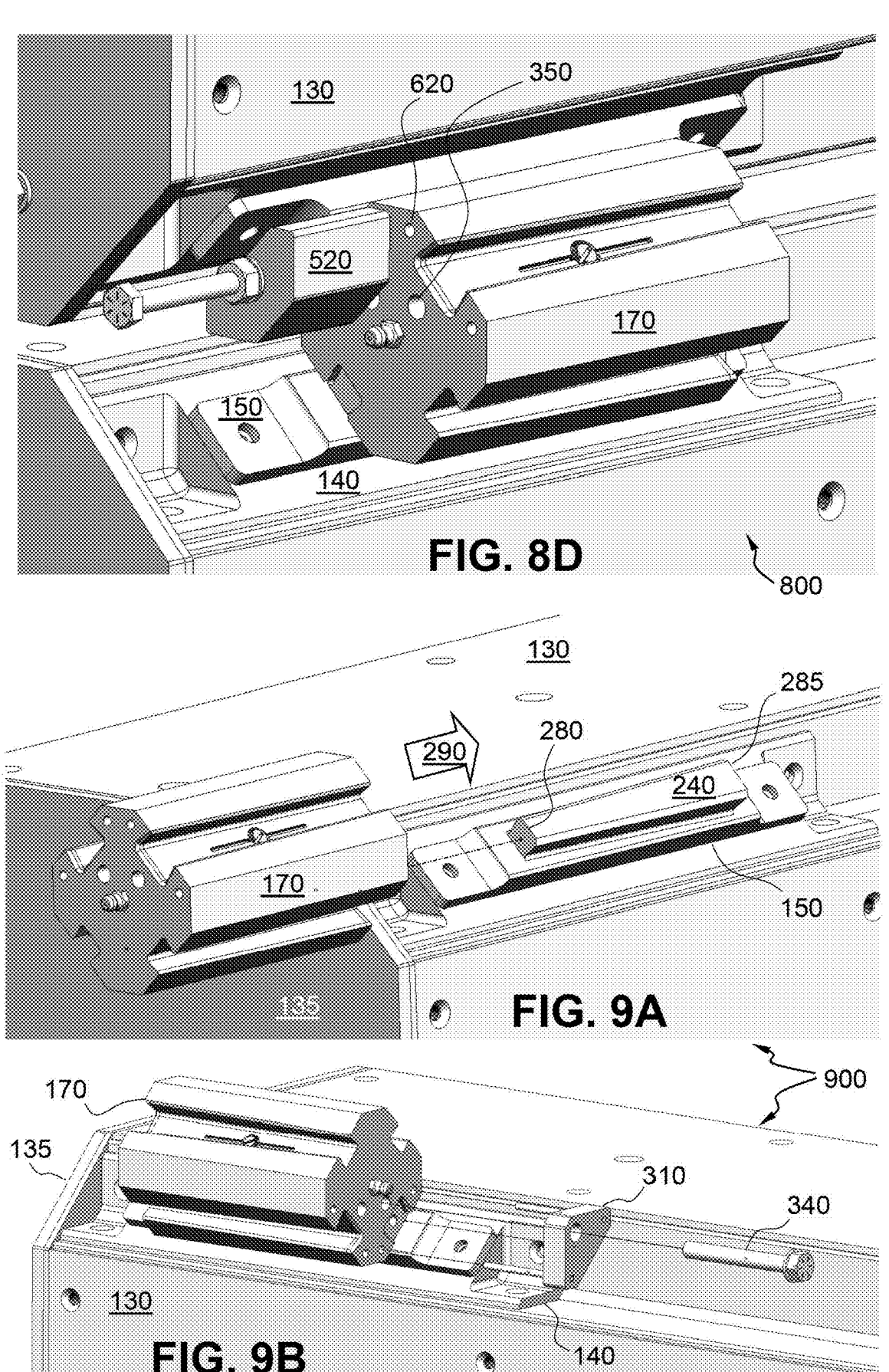
FIGS. 9A and 9B are isometric assembly views of the four-lobe connector.
Figures 10A, 10B:
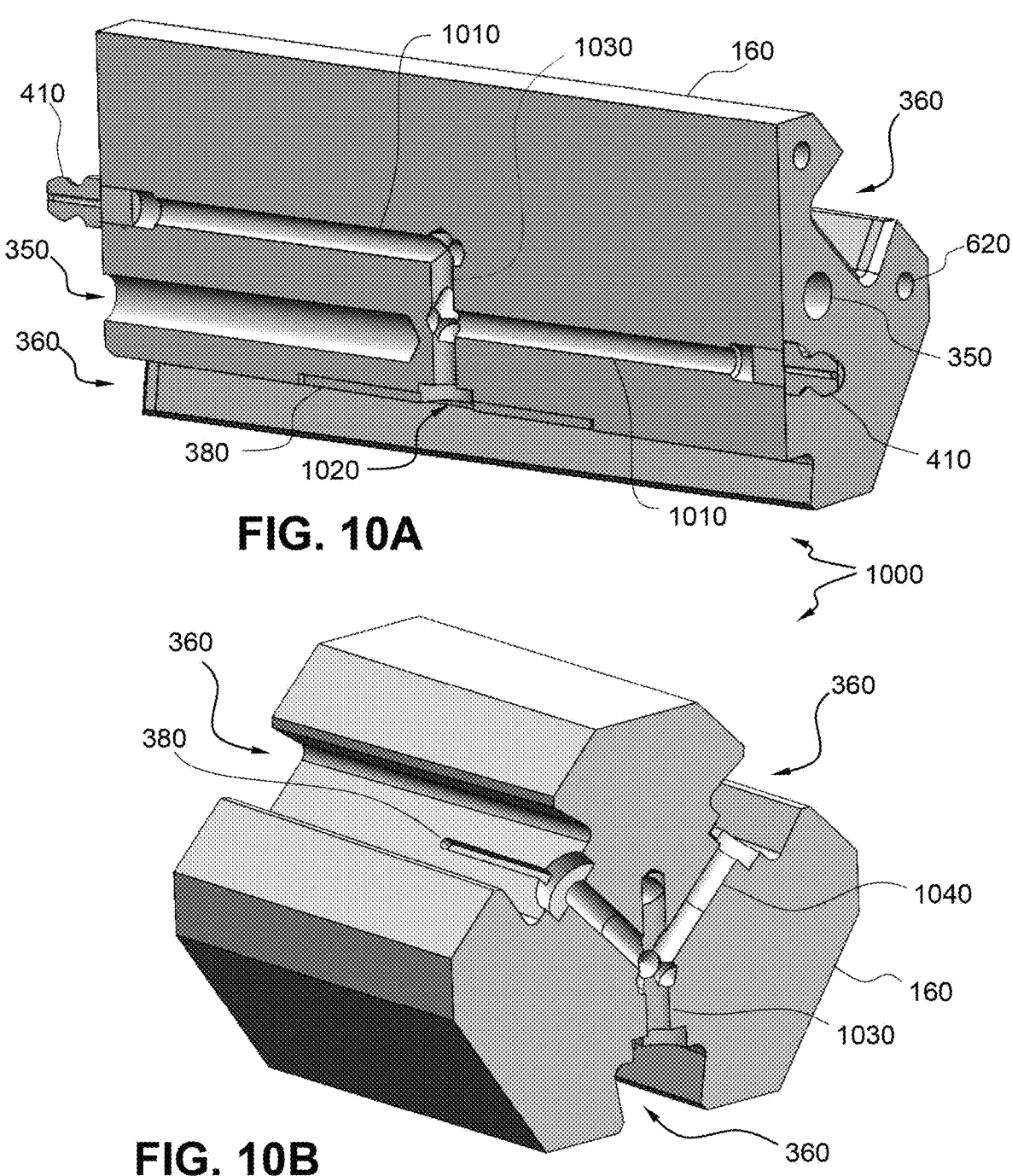
FIGS. 10A and 10B are isometric cross-section views of the three-lobe connector.
Figures 10C, 10D:
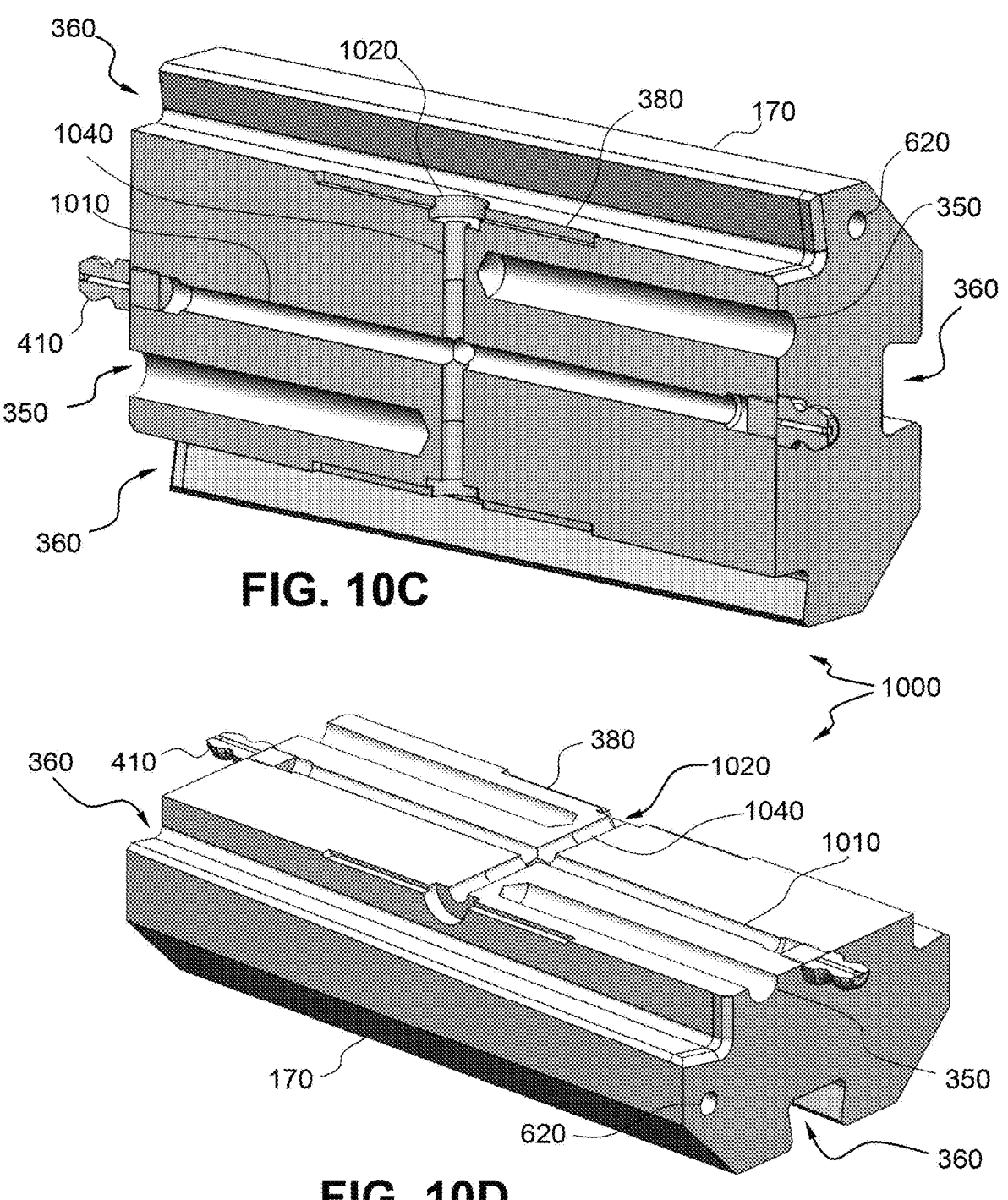
FIGS. 10C and 10D are isometric cross-section views of the four-lobe connector.

The clamp 310 inserts its prongs 330 into associated holes 620 of the block 170. The bolt 340 secures the clamp to the block 170 by its shank 810 inserting into the cavity 350 until capped by its head 820. One can note that on assembly in FIG. 8C, the remaining grooves 360 on the exposed diagonal lobes 650 remain unoccupied and can additionally receive tongues 240 from adjacent lugs 150. FIG. 8D shows a removal tool 520 with an associated nut-and-bolt 530 for releasing the lug 150 from the block 170.

FIGS. 9A and 9B show isometric assembly views 900 of the exemplary four-lobe connector. A lug 150 attaches to a mount 140 near the edge of a lower canister 130 adjacent the door 135. A block 170 slides 290 forward with its lower broad opening 275 facing forward to receive the narrow end 280 of the tongue 240. Upon completion, the clamp 310 secured by its bolt 340 slides onto the block 170 to prevent inadvertent removal.

Thus, the blocks 160 and 170 secure canisters 130 respectively to tracks 120 or stack atop each other. The three-lobe blocks 160 have a bottom facing lobe 640 that engages the track 120 and upper diagonal lobes 650 that face corners of a superimposed canister 130. The grooves 360 on each of the lobes 640 and 650 engage with tongues 240 of the lug 150 for attaching to either a track 120 on the pallet 110 or else a mount 140 on a canister 130.

FIGS. 10A, 10B, 10C and 10D show isometric cross-sectional views 1000 of the blocks 160 and 170. In particular, FIGS. 10A and 10B feature the three-lobe block 160 cut longitudinally and laterally, while FIGS. 10C and 10D feature the four-lobe block 170 longitudinally through vertical and horizontal planes. In both blocks 160 and 170, the zerk 410 injects grease into a longitudinal passage 1010 with a slightly wider opening to receive the zerk 410. The views 1000 feature the cavity 350 that receives the shank 810 of the bolt 340 to secure the clamp 310 together with the holes 620 that receive prongs 330 on the clamp 310.

A countersink depression 1020 opens either a bottom longitudinal channel 1030 in the three-lobe block 160 or a diagonal longitudinal channel 1040 in each of the blocks 160 and 170. The depression 1020 receives the plug 370 to prevent grease from entering the slot 380 of an unused groove 360. In the absence of the plug 370, grease migrates from the zerk 410 through the passage 1010 and into the channels 1030 and/or 1040 through the depression 1020 and into the slot 380 for lubricating the groove 360. The channels 1030 and 1040 intersect the passages 1010 to form a lubricant conduit or corridor.

The cavity 350, the hole 620, the passage 1010 and the channels 1030 and 1040 can be drilled into the blocks 160 and 170 as shown in views 1000. The slot 380 and depression 1020 can be milled into the grooves 360 after these have been cut into the blocks 160 and 170 machined from a solid metal bar. Edges can be rounded and smoothed to minimize injury to personnel. Such geometries can be produced via alternative manufacturing techniques, such as by forming the blocks 160 and 170 through three-dimensional printing techniques, or by casting them in an ingot mold.

Exemplary embodiments may be used as a common technique to affix launchers and similar other payloads onto one another rigidly. The strength and high stiffness provided by the connection can be beneficial to not only survive launches, but to enable comparatively large and reconfigurable launcher or payload stacks 190. This exemplary design, although untested, is expected to facilitate easy removal of launchers and individual payloads without compromising the remainder of the stack 190. The ability to tether several payloads as canisters 130 to a single node while being able to remove one payload at a time is presumed to be novel.

Additionally, the incorporation of opposite-facing tapers to aid in full seating of dovetail connections upon assembly of a tongue 240 on the lug 150 inserted into the groove 360 of the block 160 and/or 170 is also presumed to be novel. Another advantage is the ability to largely distribute the payload stack 190 for loading onto the track 120 where normal L-track hardware generates highly concentrated stresses.

The purpose of the exemplary Payload Independent Mounting Interface is to enable munition launchers and various other payloads in canisters 130 to be interfaced to one another in a stackable arrangement and as a mounting interface for the payload stack 190 to mount to a set of logistics track on a mobile platform such as the pallet 110.

Exemplary embodiments are provided to affix munition launchers—shown as canisters 130—to each other and the launcher stack 190 to a base platform such as a pallet 110. View 400 shows an assembly including the primary components of the mounting interface. The mounting lug 150 affixes to the L-track 120, which is mounted to the pallet 110 that serves as a payload platform. The three-lobe connection block 160 slides onto the lug 150 and is secured with a plate clamp 310 at the rear of the block 160.

Once the block 160 attaches to the lug 150 on the L-track 120, a canister 130 with lugs 150 slides into the connection block 160 from the front. Another clamp 310 is then used to fully seat the lug 150 into the block 160. Once all connections are complete, a grease zerk 410 on the block 160 can be used to grease all occupied grooves 360 for corrosion and prevent debris ingress.

Views 400 show an assembly including the primary components of the mounting interface. A mounting lug 150 affixes to the L-track 120 that attaches to the payload platform shown as the pallet 110. A three-lobe block 160 slides 290 onto the mounting lug 150 and is secured with a plate clamp 310 on the rear of the block 160. Once the block 160 attaches, a launcher—shown as a canister 130—with lugs 150 on its mount 140 slides into the block 160 from the front. Another clamp 310 is then used to fully seat the lug 150 into the block 160. Operations are similar with the four-lobe block 170.

Once all connections are complete, grease zerks 410 on the blocks 160 and 170 can be used to lubricate all occupied grooves 360 for corrosion and prevent debris ingress, as well as reduce friction from sliding the tongues 240 thereto. The grease channel plug 370 inserts into unoccupied grooves 360 to ensure only necessary surfaces are lubricated. Once properly torqued, the mounting interface presents its final assembled state for the stack 190. The assembly sequence is shown in view 200 for attaching the block 160 to the track 120, view 300 to secure the block 160, and view 400 for attaching a canister 130 to the block 160. Motions are restricted to longitudinal slide 290 directions.

Disassembly of the canisters 130 is substantially a direct reversal of assembly. The only difference involves the possible use of a removal tool if necessary. In the event that a lug 150 of a canister 130 is too tightly wedged for easy release, the removal tool 520 can be used. The tool 520 includes a triangular prism with a cavity that provides clearance for the lug 150 to be pulled out of the block 170 with a nut-and-bolt 530. Threading the bolt 530 of the tool 520 into the face of the lug 150 and turning its nut facilitates to draw the lug 150 out and releases the dovetail connection between the tongue 240 and the groove 360.

The tapered dovetail between the tongue 240 and the groove 360 is used as the mating geometry for the lugs 150 to ensure that positive engagement to the mating components of the blocks 160 and 170. This in conjunction with the clamps 310 create a strong, rigid structure. The tapered dovetail is also aids to guide the lug 150 into the block 160 or 170 when there's misalignment of the canisters 130. The four-lobe block 170 enables up to four canisters 130 to be tethered to a single node.

Currently, the mounting lugs 150 used in the exemplary embodiments are tapered dovetail tongues 240 secured with a plate clamp 310. This design may vary due to future testing with possibilities including tapered conical mounting lugs, dovetails with clamps that insert from the sides, etc. The lugs 150 can be custom-tailored per payload and may be altered to accompany many different types of hard-mount points on the pallet 110. The canisters 130 as payloads to be secured may also vary.

One possible utilization is that of logistics and resupply. Exemplary lugs 150 with blocks 160 and 170 could be used in conjunction with several standard sizes of cargo crates to integrate them into a single rigid structure for transport and thereby avoid custom crates or cargo nets.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An attachment fastener for removably connecting a container onto a platform, said container including a diagonal mount, said fastener comprising:

a track disposed on the platform, said track having a longitudinal direction;

first and second lugs, each lug having distal and proximal faces along a longitudinal flange; said proximal face including a tapering tongue that extends outward and along said flange; and a block having first, second and third lobes, each lobe having a tapering groove for receiving and wedging said tongue, wherein said distal face of said first lug engages said track, said distal face of said second lug engages the mount, said first lobe of said block engaging said tongue on said first lug, said second lobe of said block engaging said tongue on said second lug, said second and third lobes are angled diagonally from said first lobe that faces said track, and said block includes a zerk for receiving grease and a corridor for directing said grease to said groove.

2. The fastener according to claim 1, further including:

a clamp for inhibiting release of said block from one of said first and second lugs.

3. The fastener according to claim 2, wherein said clamp includes a bolt for threading into said block.

4. The fastener according to claim 1, wherein said track includes an exposed corrugation channel and an internal uniform slot in parallel, and said lug includes a protrusion that wedges into said channel and a detachable strip that slides within said slot.

5. The fastener according to claim 4, wherein said lug and said strip further include first and second holes in mutual alignment to pass respective first and second screws that pass through said holes to said track.

6. An attachment fastener for removably connecting first and second containers together, each container having a corresponding diagonal mount, said fastener comprising:

first and second lugs, each lug having distal and proximal faces along a longitudinal flange; said proximal face including a tapering tongue that extends outward and along said flange; and a block having first, second, third and fourth lobes, each lobe having a tapering groove for receiving and wedging said tongue, wherein said block includes a zerk for receiving grease and a corridor for directing said grease to said groove, said distal faces of said first and second lugs engage the corresponding mounts on the respective first and second containers, said first lobe of said block engage said tongue on said first lug, and said second lobe of said block engage said tongue on said second lug.

7. The fastener according to claim 6, further including:

a clamp for inhibiting release of said block from one of said first and second lugs.

8. The fastener according to claim 6, wherein said clamp includes a bolt for threading into said block.

9. The fastener according to claim 6, wherein said second and third lobes are angled diagonally from the platform.

* * * * *